June 1, 1954
D. EISINGA
2,679,981
GARBAGE GRINDER
Filed Sept. 8, 1950
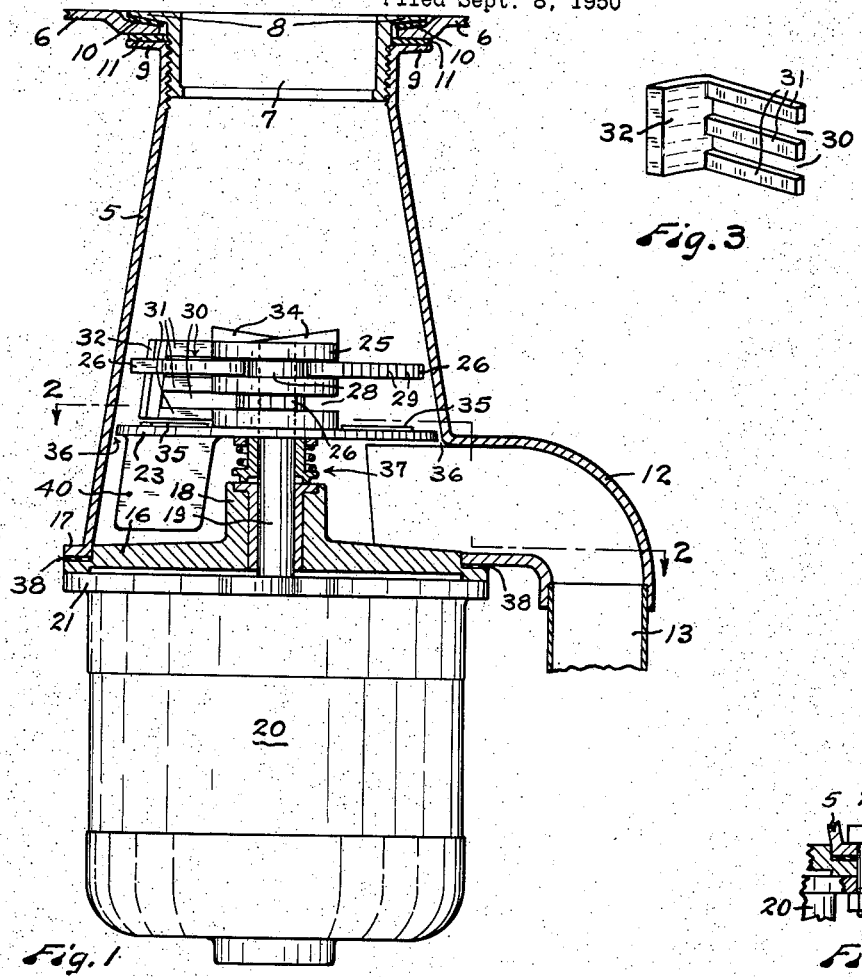
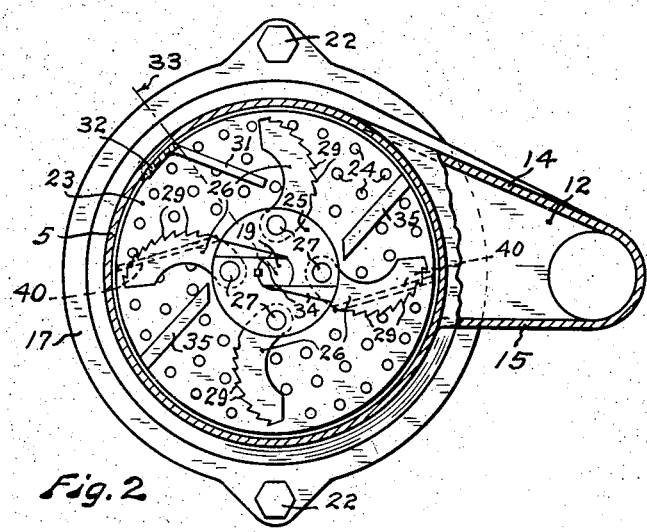
INVENTOR.
Dirk Eisinga
BY Fred C. Matheny
ATTORNEY Patented June 1, 1954

2,679,981

UNITED STATES PATENT OFFICE 2,679,981

GARBAGE GRINDER

Dirk Eisinga, Seattle, Wash., assignor to National Steel Construction Co., Seattle, Wash., a corporation of Washington Application September 8, 1950, Serial No. 183,789

8 Claims. (Cl. 241—32.5)

This invention relates to garbage grinders of a type adapted to be connected between the drain outlet of a kitchen sink and a sewer conduit to grind and comminute solid material from the sink so that it may be washed down sewer conduits without danger of clogging the sewer conduits.

Garbage grinders of this type ordinarily embody a housing having motor driven garbage grinding means therein and having a garbage and water outlet which is connected with a sewer system. The motor driven parts within the grinder housing sometimes require service. It is common practice to construct and install these grinders in such a manner as to make it necessary to break the connection between the grinder housing and the sewer system in order to obtain access to the working parts of the grinder for servicing the same.

An object of this invention is to provide a garbage grinder which is constructed and installed in such a manner that the motor and all of the movable parts of the grinder can be quickly and easily disconnected from the housing and removed as a unit for servicing or for any other purpose without breaking or in any way disturbing the connection between the grinder housing and the sewer system. This makes it possible to obtain access to the grinder housing and to service the grinder mechanism without danger of conflict with rules, regulations and ordinances relating to the sewer system.

Another object of this invention is to provide garbage grinding mechanism which will continuously work the solid material which is being ground toward the center of the grinder thus keeping this solid material in contact with rotating knife members by which it is ground.

Other objects of this invention are to provide garbage grinding means which is simple in construction, not expensive to manufacture, relatively easy to install in connection with an ordinary kitchen sink and which is highly efficient in the grinding and disposal of kitchen garbage.

Other objects will be apparent from the following description taken in connection with the accompanying drawings.

In the drawings:

Figure 1 is a view partly in vertical section and partly in elevation of a garbage grinder constructed in accordance with this invention.

Fig. 2 is a view showing most of the housing in cross section substantially on a broken line 2—2 of Fig. 1 and showing the garbage grinding means in plan.

Fig. 3 is a detached perspective view of a rake member embodied in the invention.

Fig. 4 is a fragmentary sectional view showing one satisfactory manner of detachably bolting garbage grinding and motor means to a housing so that easy removal is possible.

Like reference numerals designate like parts throughout the several views.

This garbage grinder comprises a tubular frusto-conically shaped upright housing 5 which is smaller at its upper end and larger at its lower end and which, as constructed, is open at both ends. The upper end portion of the housing 5 is communicatively connected with the drain or outlet opening of a kitchen sink 6, as by a tubular adapter fitting 7 which is threaded into the upper end portion of the housing 5. The adapter fitting 7 has an external flange 8 which cooperates with another external flange 9 on the housing 5 and with two gaskets 10 and 11 to securely clamp onto the bottom of the sink 6 so that the housing 5 is supported from the sink and communicates with the sink through the adapter fitting 7.

The side of the housing 5 has a sewer connection outlet opening provided by a tubular integral elbow shaped member 12 which is positioned near the lower end of the housing and extends outwardly and downwardly therefrom and is arranged so as to leave the lower end of the housing unobstructed. The member 12 is adapted to be connected in any suitable manner with conduit means, as exemplified by member 13, which leads to a sewer. Obviously connection with the sewer may include the usual trap means. Preferably one wall 14 of the elbow shaped outlet member 11 is substantially tangential and the other wall 15 thereof is more nearly radial. This facilitates discharge of water and comminuted solids which will, at the time of discharge, have some rotary movement in the housing 5 in a clockwise direction as respects the showing in Fig. 2.

The garbage grinding devices and driving means therefor are preferably arranged to be handled as a unit and are adapted to be applied to and removed from the bottom end portion of the housing 5 without disturbing or breaking the connection which leads from the housing 5 to the sewer. This makes it possible for a mechanic to remove the garbage grinding unit for service, repair or adjustment without requiring the services of a plumber to disconnect and connect the sewer conduits.

The garbage grinding unit comprises a disc shaped closure member 16 adapted to fit against an external flange 17 on the open bottom end of the housing 5. A hub 18 is provided on the upper side of the closure member 16 and a driven shaft 19 of a motor 20 extends upwardly through the hub 18. A flange 21 on the upper end of the housing of motor 20 is adapted to engage with the marginal portion of the closure member 16. Bolts 22 extend through widened portions of the flanges 17 and 21 and closure member 16 to secure the motor 20 and closure member 16 to the housing 5. Two bolts 22 are shown but obviously more may be used. The bolts 22 form readily detachable means for securing the garbage grinding unit including the motor 20 to the housing 5. Preferably a gasket 38 is provided between the housing flange 17 and the closure member 16.

Garbage grinding means is carried by the upper end portion of the shaft 19 and is secured to said shaft so that it will be rotated with the shaft. This garbage grinding means comprises a disc 23 having perforations 24 therein and hub means 25 having a plurality of cutter members 26 connected therewith by pivot members 27. Preferably the hub means 25 has at least two annular grooves 28 provided therein, one above the other, and the inner end portions of the cutter members 26 are positioned in these grooves 28. In this disclosure I show two diametrically opposite cutter members 26 provided in each groove 28. This provides two pairs of cutter members disposed in two different planes one above another. Obviously the number of sets of cutter members and the number of cutter members in each set may be varied.

Each cutter member 26 is preferably curved, as shown in Fig. 2, to provide a convex forward edge which has teeth 29 thereon. The pivot members 27 are positioned outwardly from the shaft 19 and when the shaft 19 and parts connected therewith are rotated the cutter members 26 will tend to assume radial positions substantially as shown in Fig. 2.

When the garbage grinding means is in operation the cutter members 26 successively pass through slots 30 between the tines or fingers 31 of a rake member. The rake member has a base portion 32 which is welded or otherwise rigidly secured to the inside wall of the housing 5. The rake tines 31 are not radial but as respects the direction of movement of the cutters 26, are inclined at an angle of about thirty degrees forwardly, from a radial line 33 which passes through the outermost extremities of the rake teeth 31 and the center of the shaft 19. Because of this incline the rake teeth 31 in cooperation with the cutter members 26 tend to continuously crowd solid matter toward the center of the housing 5. This keeps the solid matter always crowded toward the center of the machine where it will be in the path of the cutter members 26 and will be broken up and comminuted by the grinding action of the teeth 29.

Preferably top cutter members 34 are provided on the upper end of the hub 29 to cut up and break into parts any long pieces of garbage material which chance to drop crosswise of this hub member 25. Also preferably a number of thin scraper members 35 are rigidly mounted on the upper face of the disc 23 in such positions that they will shear past the lower edge of the lowermost rake tooth 31 and will tend to break and grind up any solid matter which rests on the disc 23 and tends to pile up against the rake teeth 31.

The disc 23 is of slightly smaller diameter than the part of the housing in which it is disposed. This provides between the periphery of this disc 23 and the housing wall a narrow annular passageway 36 through which water and comminuted material may pass downwardly.

Seal means 37 is provided around the shaft 19 between the hub 18 of closure member 16 and the plate 23 to exclude water and ground solid matter from the shaft 19 and its bearings.

Preferably two vanes 40 are rigidly connected with the disc 23 and extend downwardly therefrom into the space between said disc 23 and the closure member 16. The vanes 40 are inclined relative to radial planes of the machine and these vanes operate to urge comminuted solids and liquids toward the discharge conduit member 12.

When this garbage grinder is to be used the motor 20 is started and water and garbage are allowed to pass downwardly through the housing 5. The garbage will be quickly comminuted and will be washed down through the perforations 24 and through the annular passageway 28 and will discharge through the outlet means 12 and 13 to the sewer.

The cutter members 26 passing between the rake teeth 31 will quickly grind up such solid matter as is ordinarily found in kitchen garbage. The rake teeth 31, because of their inclined or non-radial positioning, will continuously deflect and urge the solid matter toward the center of the machine into the path of the cutter members 26 and will prevent the solid matter from escaping contact with the cutters by hugging the wall of the housing 5. The garbage will feed down readily due to the expanding shape of the housing 5 from intake to discharge end.

The foregoing description and accompanying drawings clearly disclose a preferred embodiment of this invention but it will be understod that changes in the invention may be made within the scope and spirit of the following claims.

I claim:

1. Garbage grinding apparatus adapted for installation beneath a kitchen sink having a drainage opening, comprising a frusto-conical tubular housing open at both ends and having its upper end portion communicatively connected with the drainage opening of the sink, said housing having a sewer connection outlet opening provided in its side above the open lower end of said housing; sewer conduit means communicatively connected with said sewer connection outlet opening; a closure member removaby attached to the open lower end of said housing; garbage grinding mechanism connected with said closure member and operatively disposed within said housing when the closure member is attached to the housing and adapted to be withdrawn from the lower end of the housing by removal of the closure member from the housing without disturbing the connection of said sewer conduit means with the housing; and a motor positioned below said closure member and operatively connected with said garbage grinding mechanism.

2. Garbage grinding apparatus adapted for installation beneath a kitchen sink having a drainage opening comprising a frusto-conical tubular housing open at both ends and having its upper end portion communicatively connected with the drainage opening of the sink, said housing having a sewer connection outlet opening provided in its side above the open lower end of said housing; sewer conduit means communicatively connected with said sewer connection outlet opening; a closure member adapted to close the open lower end of said housing; a motor positioned below said closure member and having a shaft extending upwardly through said closure member; detachable means removably securing said closure member and said motor to said housing; and garbage grinding mechanism carried by the upper end portion of said motor shaft and supported within said housing above said sewer connection outlet opening and in spaced relation above said closure member when the motor and closure member are attached to the housing, said motor and closure member and garbage grinding mechanism being removable as a unit from said housing without disturbing the connection of the sewer conduit means with the housing.

3. Garbage grinding apparatus adapted for installation beneath a kitchen sink having a drainage opening, comprising a tubular housing having its upper end portion communicatively connected with the drainage opening of the sink, the lower end portion of said housing being closed and said housing having a sewer connection outlet opening provided in the side thereof adjacent the lower end; a driven shaft extending upwardly into said housing coaxially thereof; hub means secured to the upper end portion of said shaft; a plurality of arcuately curved toothed cutters pivotally mounted in said hub means on axes parallel to said shaft, whereby rotation of said shaft and said hub means will centrifugally urge said cutters into positions substantially perpendicular to said shaft; bifurcated rake means fixedly supported within the housing in the path of said cutters, said rake means having slots through which the cutters are adapted to pass and said rake means, from outer to inner end thereof, being inclined at a substantial angle relative to the radial in the direction of movement of the cutters to deflect solid matter toward the center; and a perforated rotatable disc rigid with said hub means below said cutters, said disc being supported in the housing above said sewer connection opening and being of a diameter slightly smaller than the internal diameter of the housing in the plane of said disc and cooperating with the housing to form a narrow annular passageway for ground material around said disc.

4. Garbage grinding apparatus adapted for installation beneath a kitchen sink having a drainage opening, comprising a frusto-conical tubular housing open at both ends and having its upper end portion communicatively connected with the drainage opening of the sink, said housing having a sewer connection outlet opening provided in its side above the open lower end of said housing; sewer conduit means communicatively connected with said sewer connection outlet opening; a closure member adapted to close the open lower end of said housing; a motor positioned below said closure member, and having a shaft extending upwardly through said closure member; detachable means removably securing said closure member and said motor to said housing; hub means secured to the upper end portion of said shaft; a plurality of arcuately curved toothed cutters pivotally mounted in said hub means on axes parallel to said shaft whereby rotation of said shaft and said hub means will centrifugally urge said cutters into positions substantially perpendicular to said shaft; bifurcated rake means fixedly supported within the housing in the path of said cutters, said rake means having slots through which the cutters are adapted to pass; and a perforated disc rigid with said hub means below said cutters, the external diameter of the disc being slightly less than the internal diameter of the adjacent part of the housing providing running clearance and a discharge passageway for ground material between the disc and the housing, said disc being supported in the housing above said sewer connection opening when the motor and closure member are attached to the housing.

5. Garbage grinding apparatus adapted for installation beneath a kitchen sink having a drainage opening, comprising a tubular housing having its upper end portion communicatively connected with the drainage opening of the sink, the lower end portion of said housing being closed and said housing having a sewer connection outlet opening provided in the side thereof adjacent the lower end; a driven shaft extending upwardly into said housing coaxially thereof; hub means secured to the upper end portion of said shaft; substantially radial vanes rigid with the upper end portion of said hub means; a plurality of arcuately curved toothed cutters pivotally mounted in said hub means on axes parallel to said shaft, whereby rotation of said shaft and said hub means will centrifugally urge said cutters into positions substantially perpendicular to said shaft; bifurcated rake means fixedly supported within the housing in the path of said cutters, said rake means having teeth between which the cutters are adapted to pass; a perforated disc rigid with said hub means below said cutters, the external diameter of the disc being slightly less than the internal diameter of the adjacent part of the housing providing running clearance and a discharge passageway for ground material between the disc and the housing, said disc being supported in the housing above said sewer connection opening; and relatively thin, flat scraper members rigid with the upper side of said perforated disc extending from the circumferential portion of the disc toward said hub means.

6. Garbage grinding apparatus adapted for installation beneath a kitchen sink having a drainage opening, comprising a tubular housing having its upper end portion communicatively connected with the drainage opening of the sink, the lower end portion of said housing being closed and said housing having a sewer connection outlet opening provided in the side thereof adjacent the lower end; a driven shaft extending upwardly into said housing coaxially thereof; cylindrical hub means secured to the upper end portion of said shaft, said hub means having a plurality of annular grooves therein; a plurality of relatively thin, flat cutter members each having one end portion thereof positioned in one of said grooves; pivot members in said hub parallel with said shaft and radially spaced from the axis of said shaft pivotally connecting each cutter member with said hub; rake means rigidly secured to the inner wall of said housing and extending toward said hub means into the path of movement of said cutters, said rake means having spaced apart teeth which are offset relative to the cutters and which extend between the cutters; a perforated disc rigid with said hub means below said cutters, said disc being positioned a short distance above said sewer connection opening and the diameter of said disc being slightly less than the internal diameter of the housing in the plane of the disc, whereby the disc forms a perforated partition in the housing above the sewer connection opening and relatively thin, flat scraper members rigid with the upper side of said perforated disc extending from the circumferential portion of the disc toward said hub means.

7. In a garbage grinder, a frusto-conically shaped tubular housing adapted for installation beneath a kitchen sink and having a sewer connection outlet opening in the lower portion thereof; a driven shaft extending upwardly into said housing coaxially thereof; cutter members in the housing pivotally connected with the shaft by pivots parallel with the shaft and spaced outwardly from the center of the shaft; and nonradial rake means secured to the housing wall and extending inwardly therefrom, said rake means having spaced apart tines between which the cutters pass and said tines from outer to inner end thereof being inclined at a substantial angle relative to the radial in the direction of movement of the cutters, said rake means and said cutters cooperating to continuously urge garbage toward the center of the housing and to grind the garbage.

8. The apparatus as claimed in claim 6 in which downwardly extending flat vanes are secured to the perforated disc and are operatively disposed in the space between the perforated disc and the lower portion of the housing, said vanes being inclined rearward of their direction of rotation at a substantial angle from inner to outer extremities thereof relative to radial planes which pass through the axis of the machine.

References Cited in the file of this patent
UNITED STATES PATENTS

| Number | Name | Date |
|---|---|---|
| 978,034 | Kinsey | Dec. 6, 1910 |
| 1,766,325 | Boze | June 24, 1930 |
| 1,898,243 | Coble et al. | Feb. 21, 1933 |
| 2,012,680 | Hammes | Aug. 27, 1935 |
| 2,044,548 | Schwennker | June 16, 1936 |
| 2,428,420 | Green | Oct. 7, 1947 |
| 2,442,812 | Jordan | June 8, 1948 |
| 2,463,843 | Wright | Mar. 8, 1949 |
| 2,482,125 | Powers | Sept. 20, 1949 |
| 2,536,930 | Hammell | Jan. 2, 1951 |
| 2,566,721 | Dunbar | Sept. 4, 1951 |
| 2,594,250 | Tranbarger | Apr. 22, 1952 |